May 11, 1926.

C. A. KULENKAMPFF 1,584,562

CREAM WHIPPING DEVICE

Filed May 20, 1925

WITNESSES
H. J. Walker
A. L. Kitchin

INVENTOR
C. A. Kulenkampff
BY Munn Co
ATTORNEYS

Patented May 11, 1926.

1,584,562

UNITED STATES PATENT OFFICE.

CARL A. KULENKAMPFF, OF BROOKLYN, NEW YORK.

CREAM-WHIPPING DEVICE.

Application filed May 20, 1925. Serial No. 31,563.

This invention relates to cream whipping machines and has for an object to provide an improved construction which may beat substantially any desired quantity of cream but is particularly adapted to efficiently beat a small quantity of cream.

Another object of the invention is to provide a cream whipping machine in which the whipping or beating structure may be quickly and easily removed from the container.

A further object, more specifically, is to provide a cream whipping machine which is power driven and wherein the whipping or beating member is arranged in a container with an extension removably clutched to the electric driving mechanism, the parts being so formed that upon opening the container the whipping or beating member may be quickly removed from the container and also disconnected from the driving mechanism without the use of tools or complicated adjustment.

In the accompanying drawing—

Figure 1:
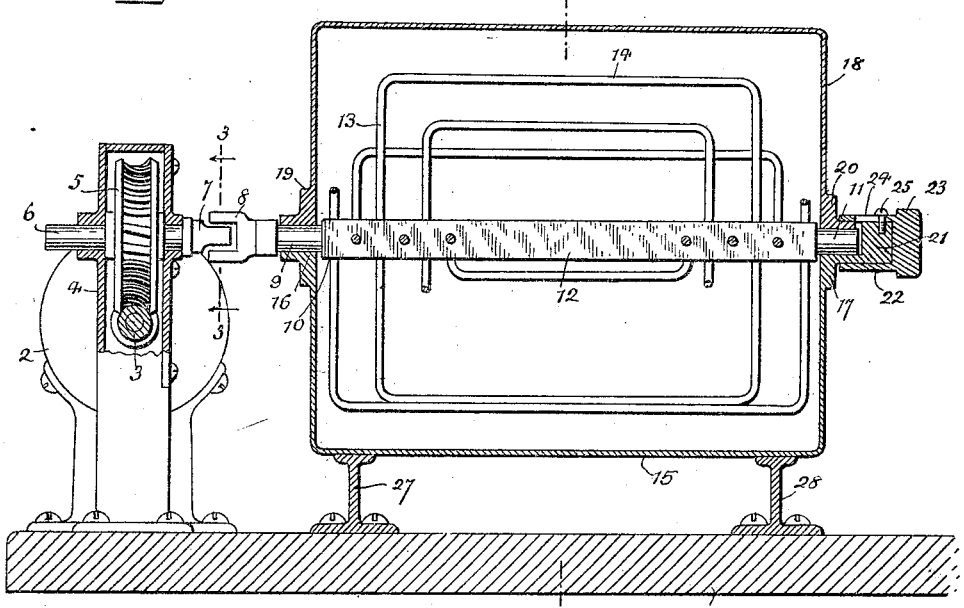
Figure 1 is a longitudinal vertical sectional view through a cream whipping machine, disclosing an embodiment of the invention.
Figures 2, 3, 4:
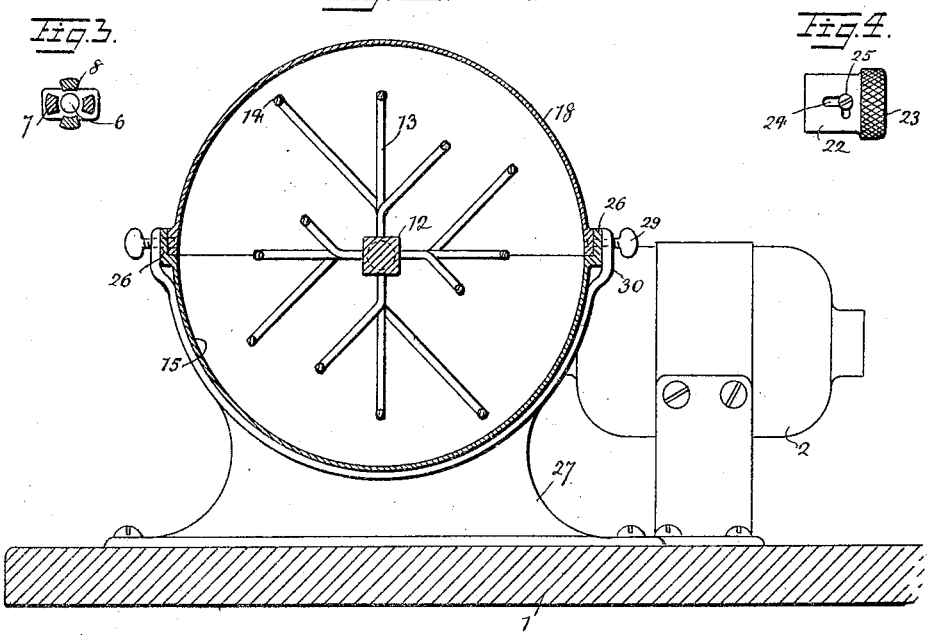
Figure 2 is a sectional view through Figure 1, approximately on line 2—2.
Figure 3 is a detail fragmentary sectional view through Figure 1 on line 3—3.
Figure 4 is a top plan view of a locking cap embodying certain features of the invention.

Referring to the accompanying drawings by numerals, 1 indicates a table or support of any kind on which the device is adapted to be mounted. As indicated in Figures 1 and 2, an electric motor 2 is mounted on the support 1, said motor having a worm 3 connected therewith so as to be rotated thereby. The worm 3 extends into a box or housing 4 in which is mounted a worm wheel 5 continually meshing with the worm 3. The worm wheel 5 is rigidly connected with a shaft 6, which shaft is rotated thereby and rigidly connected with this shaft is a clutch member 7 co-acting with the clutch member 8 rigidly secured to the shaft 9 mounted on the beater or whipping device 10. The beater or whipping device 10 is provided with a shaft 9 at one end and a shaft 11 at the opposite end with a square section 12 between these shafts. A plurality of beating arms 13 are rigidly secured to section 12, said arms being arranged in pairs and connected by sections 14 parallel with section 12. The various arms are of different lengths and, consequently, the sections 14 are spaced at different distances from the section 12 so that as the section 12 and associated parts are rotated, the cream or other matter in the container 15 will be beaten or whipped in a number of different planes. It will also be noted particularly from Figure 2 that the beater arms are bent at different angles so as to better space the section 14. Journal boxes 16 and 17 are rigidly connected with the container 15 and in these journal boxes rest the shafts 9 and 11. A cover 18, arc-shaped in cross section, is also provided and is formed with journal boxes 19 and 20 adapted to rest on the journal boxes 16 and 17 and thereby completely surround the shafts 9 and 11. The journal box 17 is provided with a cylindrical end 21 on which is slidingly mounted a sleeve 22 having a roughened thumb member 23 whereby it may be manipulated. The sleeve 22 carries a bayonet slot 24 through which the screw 25 extends, said screw being threaded into the tubular end 21.

When the sleeve is in the position shown in Figure 1, journal box 20 is locked in position on top of the journal box 17 but when it is desired to remove the cover 18, sleeve 22 is shifted to the right from the position shown in Figure 1, slot 24 being long enough to permit the end of the sleeve to pass beyond the end of the journal box 20 whereby cover 18 may be easily lifted off of the container 14. In order to provide a reasonably tight connection between the container 15 and cover 18, an offset portion 26 is provided on each longitudinal edge of the container 15 and in this offset portion the lower edge of the cover 18 rests as shown in Figure 2. The container 14 is supported by a framework of any desired kind, as for instance, by brackets 27 and 28. These brackets are of identical construction and are formed substantially as shown in Figures 1 and 2. A set screw 29 is arranged at the upper part of each of the brackets, said set screw extending through the flanges 30 of the brackets and through the offset portion 26 so as to pinch the lower part of the cover 18 and thereby lock the same in place. It is, therefore, evident that these set screws must be loosened and sleeve 22 pulled back before cover 18 can be removed. After the cover 22 has been removed, the beating device 10 may be grasped at any desired point and bodily raised out of the container, if the clutch member 7 is arranged as shown in Figures 1 and 3. If this clutch member is in a different position, it will be necessary to raise the right end of the beating device 10 as shown in Figure 1 and then move the same slightly to the right until the clutch 8 leaves the clutch 7 whereupon the device 10 may be disposed of in any desired manner. In forming the section 12 square, the same has been done designedly in order that the corners may act as beating members and prevent a central still portion in the container. The container will function properly with a small quantity of cream or other articles or with a comparatively large quantity, as for instance, a quantity sufficient to fill the entire container 15.

What I claim is:—

1. In a cream whipping machine, a container and a beater arranged in the container, said beater comprising journal members for presenting supports, a squared central section acting to beat the cream adjacent thereto and a plurality of beating arms extending radially from the squared section, each of said beating arms being connected by a bar parallel to said squared section, said arms extending radially from each face of the squared section with certain of the arms bent at different angles, said arms and the respective bars being also of different lengths whereby the connecting bar thereof will be spaced at different distances from said squared section and from the ends of the container thus providing beating members distributed throughout the container as the device operates.

2. In a cream whipping device, a container, a rotatable whipping or beating device positioned in the container, said device being provided with journal members extending from each end thereof, a cover for said container, a sliding sleeve for locking said cover in position, said sleeve being movable away from said cover but not away from the container whereby the cover may be removed, and means operatively associated with the beater for rotating the same.

3. A cream whipping machine, comprising a trough-shaped container, a similar shaped cover removably fitting on top of the container, said container having a journal box near each end, a beating device formed with journal members fitting into said journal boxes, said beating device having a plurality of radiating beating members for whipping or beating the cream as the beating device rotates, a sliding member for holding the cover and one end of the beating device in position, a power driving member at the opposite end of the beating device, and a readily disengageable clutch for connecting the power driving means with the beating device.

CARL A. KULENKAMPFF.